United States Patent [19]
Aubert et al.

[11] 3,915,792
[45] Oct. 28, 1975

[54] TRANSFER HOOD FOR HANDLING FUEL ASSEMBLIES IN NUCLEAR REACTORS AND ESPECIALLY FAST REACTORS

[75] Inventors: Michel Aubert, Pierrevert; Daniel Merland, Manosque; Charley Renaux, Jouques, all of France

[73] Assignee: Commissariat a l'Energie Atomique, Paris, France

[22] Filed: June 1, 1973

[21] Appl. No.: 365,852

[30] Foreign Application Priority Data
June 8, 1972 France .............................. 72.20634

[52] U.S. Cl. ................................. 176/30; 214/18 N
[51] Int. Cl. ............................................ G21c 19/20
[58] Field of Search ............................. 176/30–32, 176/87; 214/18 N

[56] References Cited
UNITED STATES PATENTS
3,089,836   5/1963   Wootton ............................. 176/32
3,773,616   11/1973   Aubert ................................. 176/30

*Primary Examiner*—Robert F. Stahl
*Attorney, Agent, or Firm*—Cameron, Kerkam, Sutton, Stowell & Stowell

[57] ABSTRACT

A hood for transferring fuel assemblies between two or more separate guide ramps inclined to the vertical at the same angle of slope and extending respectively through a first passage into the reactor vessel and through a second passage into a fuel-assembly storage chamber. The hood comprises at least one shielded duct joined to a flanged rotating portion which is so arranged that the open lower end of the shielded duct is positioned in the line of extension of one guide ramp and then the other as a result of displacement of the rotating portion.

6 Claims, 3 Drawing Figures

TRANSFER HOOD FOR HANDLING FUEL ASSEMBLIES IN NUCLEAR REACTORS AND ESPECIALLY FAST REACTORS

This invention relates to a transfer hood for handling the fuel assemblies of a nuclear reactor and especially a fast reactor comprising a core formed by a group of assemblies of this type which is disposed within a thick-walled biological shield structure or pressure vessel and cooled by a circulation of liquid metal which is usually liquid sodium.

It is known that in reactors of this type, the fuel assemblies must be withdrawn from the pressure vessel after a predetermined period of operation within the reactor core and then deposited within an adjacent storage chamber in which said assemblies can release the residual power contained therein without any danger during a sufficient period of time to ensure at least partial radioactive decay before undergoing a subsequent treatment for separating the cans from the fuel material in order to recover this latter.

In a first design solution which is already known, each fuel assembly to be withdrawn from the reactor core is placed within the interior of the pressure vessel in a flask which has been filled with the coolant liquid at the time of immersion at the level of the core. The flask which contains the fuel assembly is then transferred to a wheeled hood equipped with a hoist, said hood being capable of displacement from a loading station on top of the pressure vessel to an unloading station located above the storage chamber. This first design solution has a disadvantage in that it entails the need for coupling and uncoupling of the hood at each station and that the corresponding operations are liable to cause external contamination accidents or to result in the introduction of air into the reactor vessel. Moreover, the volume generated by the hood during its displacement is substantial and the overall size of this latter is also not negligible, especially if said hood is intended to pass through a lock-chamber or a pressure-resistant wall.

In another conventional solution, the fuel assemblies which are also placed within the interior of the pressure vessel in a transfer flask are conveyed from said pressure vessel to the storage chamber by means of a leak-tight hood which is placed over two openings formed respectively in the pressure vessel and in the chamber, said openings being traversed by the ends of two inclined ramps for guiding the assembly to be transferred. Said assembly is taken from the pressure-vessel ramp and then transferred to the chamber ramp by means of a rocking device which is mounted within the hood and associated with an independent control system. The result thereby achieved is to provide a totally leakproof assembly which prevents contamination of the surrounding medium and ensures protection against radiation.

The aim of this invention is to provide a transfer hood which is related to the second design solution contemplated in the prior art and recalled in the foregoing but in which the different basic concept avoids the need to employ a rocking device and therefore simplifies the design of the control mechanisms of the installation. Furthermore, in an improved version of said hood, the invention permits a considerably higher operating frequency since the operations involved in extraction of an irradiated fuel assembly from the pressure vessel can be carried out at the same time as those involved in the introduction of another assembly into the storage chamber or else at the same time as the extraction of a fresh fuel assembly from the said chamber in order to replace the spent assembly which has just been withdrawn.

To this end, the invention relates to a hood for transferring fuel assemblies between at least two separate oblique guide ramps which have the same angle of inclination with respect to the vertical and one of which extends through a first passage into the reactor vessel whilst the second guide ramp extends through a second passage into the fuel-assembly storage chamber, wherein said hood comprises at least one shielded duct having an open lower end and joined to a rotating portion of the hood which has a horizontal positioning flange, said rotating portion being capable of moving about a vertical axis and so arranged that the lower end of the shielded duct comes in the line of extension of one guide ramp and then the other as a result of the rotational motion of said rotating portion.

In accordance with a particular feature of the invention, the shielded duct is inclined to the vertical at the same angle as the guide ramps and is provided at the upper end thereof with a chain-type hoist or the like for controlling a carriage which supports a flask containing the fuel assembly to be transferred as said carriage is displaced within the duct and along the inclined guide ramp which is placed in the line of extension thereof. Advantageously, the upper end of the shielded duct is connected in leak-tight manner to a well in which the chain of the hoist is stored.

In accordance with a further characteristic feature, the horizontal flange of the rotating portion of the hood comprises a peripheral toothed ring disposed in meshing engagement with a pinion driven by a reductiongear motor, the rotating portion being capable of moving within a support frame by means of a roller-bearing, positioning means and sealing means being provided between said rotating portion and said frame. Preferably, the frame supports at least one slide-valve body which is capable of isolating the passages of the inclined guide ramps from the shielded duct during the movements of rotation of the rotating portion. In another preferred arrangement, means are provided for applying the valve body against the pressure vessel and the storage chamber in leak-tight manner after positioning of the hood over the passages of the inclined guide ramps, said means being such as to comprise at least one application spring and an annular bellows element connected on the one hand to the valve body and on the other hand to the support frame.

Finally and in a particular embodiment of the invention, the rotating portion comprises two inclined ducts disposed in two symmetrical vertical planes relatively displaced on each side of the axis of the horizontal flange and adapted to come alternately in the line of extension of two guide ramps as a result of rotation of said rotating portion through an angle of 180°.

Further properties of a transfer hood constructed in accordance with the invention will become apparent from the following description of one exemplified embodiment which is given by way of indication without any limitation being implied, reference being made to the accompanying drawings, wherein.

Figure 1:
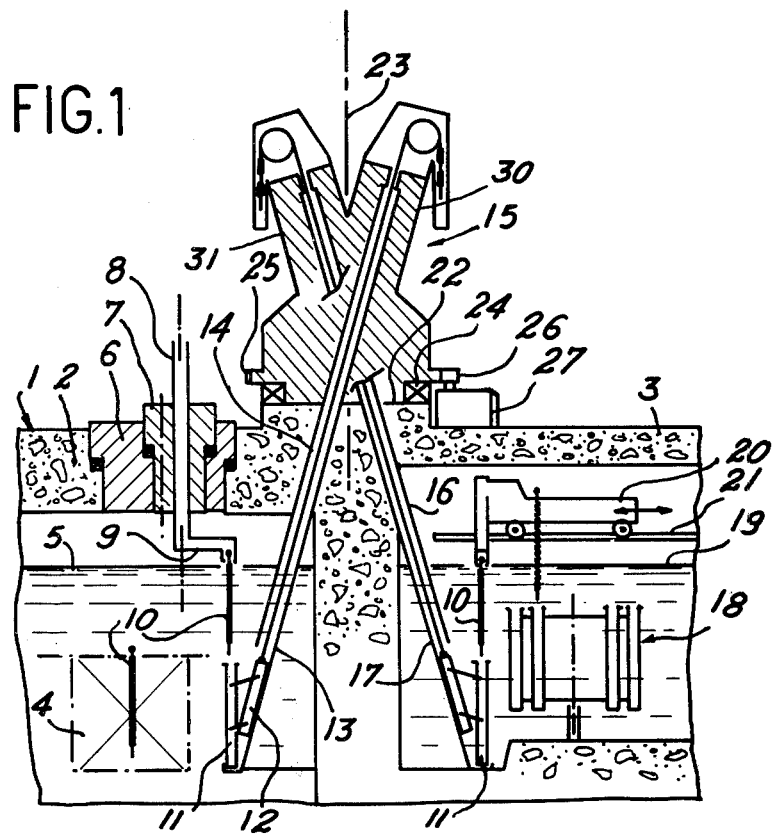
FIG. 1 is a diagrammatic sectional view of a transfer hood in accordance with the invention as adapted to carry out the extraction of fuel assemblies from the pressure vessel of a nuclear reactor and the transfer of said fuel assemblies into a storage chamber or conversely.
Figure 2:
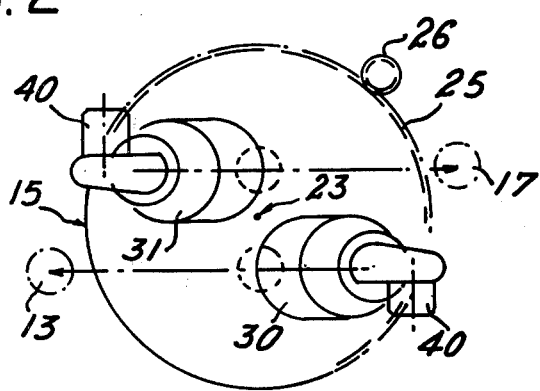
FIG. 2 is a partial top view of the hood which is illustrated in FIG. 1.

In FIG. 1, the reference numeral 1 designates a thick-walled concrete structure which delimits on the one hand the pressure vessel 2 of a nuclear reactor and especially a fast reactor and, on the other hand, a storage chamber 3 which is adjacent to the pressure vessel 2 and intended to receive the fuel assemblies which are either withdrawn from the pressure vessel or ready to be introduced into this latter in order to replace those which have been withdrawn. There is placed within the pressure vessel 2 the reactor core 4 which is represented as being immersed in a suitable volume 5 of coolant liquid usually consisting of liquid sodium. Provision is made in the top wall of the pressure vessel 2 for an assembly which provides access to the interior of the vessel and is formed by two shield plugs 6 and 7. The plug 7 is mounted eccentrically within the plug 6 so that, as a result of the relative movements of rotation of said two plugs, a handling arm 8 which passes axially through the plug 7 and on the lower end of which is mounted an extension arm 9 is permitted to place said extension arm over any fuel assembly 10 within the reactor core 4, said core being essentially constituted by the juxtaposed arrangement of said fuel assemblies. Under these conditions, the withdrawal of one fuel assembly from the core 4 by means of the handling arm 8 is carried out inside the pressure vessel within the volume 5 of sodium and permits the separate displacement of each fuel assembly considered from its position within the reactor core to an handling flask 11. Said flask, which is filled with sodium and associated with a carriage 12, can be displaced along an inclined guide ramp 13 which traverses the top portion of the pressure vessel 2 through a passage 14, said guide ramp 13 being extended by a shielded duct 30 within a hood 15, the constructional detail of which will be described hereinafter. Similarly, the storage chamber 3 is provided with a passage 16 for a guide ramp 17 which is inclined to the vertical at the same angle as the ramp 13 but located in a different plane from this latter; in the example considered, the planes of the two guide ramps are vertical, parallel and symmetrical with respect to a vertical axis 23 which coincides with the axis of the hood 15 (as shown in FIG. 2). By means of the second guide ramp 17, the flask 11 which contains a fuel assembly 10 can be transferred either from the hood 15 towards the interior of the chamber 3 in order to be stored therein or conversely, while withdrawing a fuel assembly from said chamber and transferring said assembly to a second shielded duct 31 which is located in the line of extension of the guide ramp 17. Provision is made within the chamber 3 for a receptacle 18 which contains the fuel assemblies 10 and is immersed in a suitable volume 19 of sodium. Within the chamber 3, the withdrawal of the fuel assemblies 10 from the flask 11 is carried out by means of a conveying unit 20 which travels along rails 21 placed within the chamber 3 above the level of the sodium.

In order to permit transfer of the fuel elements 10 from the guide ramp 13 to the guide ramp 17 or conversely by means of the ducts 30 and 31 of the hood 15, the lower end of said hood rests on the surface of the concrete structure 1 (as shown in FIG. 1) between the pressure vessel 2 and the chamber 3 so as to cover the passages 14 and 16 of the guide ramps 13 and 17. Said hood comprises a portion which is capable of moving in rotation about its vertical axis 23 by means of a ball-bearing or ball and roller bearing 24, displacement of said hood being obtained by means of a peripheral toothed ring 25 disposed in meshing engagement with a driving pinion 26 which is driven by a reduction-gear motor 27.

Figure 3:
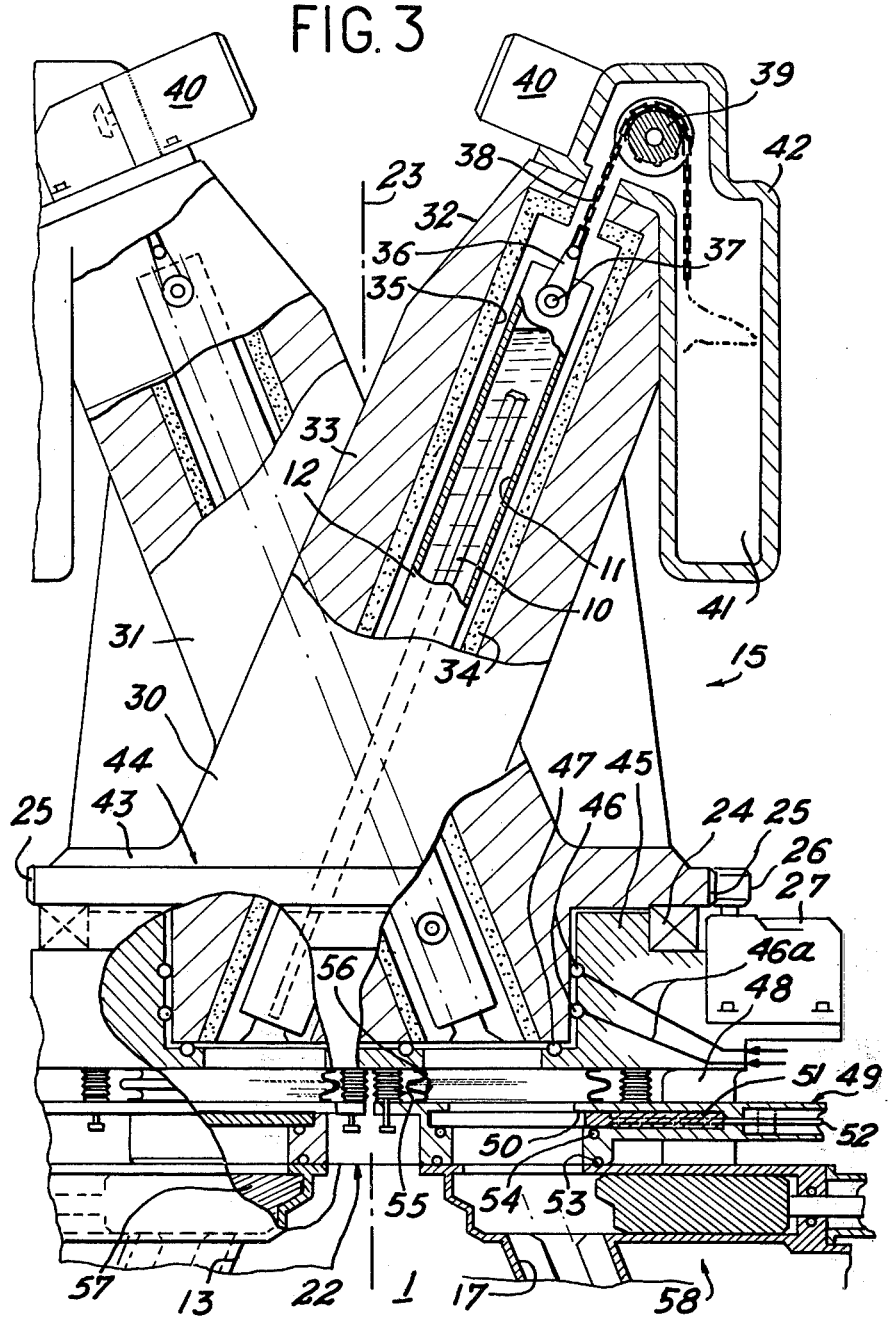
FIG. 3 is a part-sectional view in elevation to a larger scale showing the hood under consideration.

FIG. 3 illustrates the constructional detail of the hood 15 to a larger scale and permits a clearer definition of the practical operation involved in carrying out the transfer of the flask 11 containing a fuel assembly 10 from the guide ramp 13 to the guide ramp 17 or conversely. In the example of construction which is illustrated in the drawings, said hood 15 is provided with two shielded ducts 30 and 31 respectively, said ducts being inclined to the vertical axis 23 of the hood at the same angle as the guide ramps 13 and 17. Thus, when the hood is suitably positioned as a result of rotational travel between two stops which are adjusted at the time of assembly, said shielded ducts can consequently be brought exactly in the line of extension of said guide ramps. The following description will refer solely to the construction of one of the shielded ducts aforesaid such as the duct 30, for example, it being readily understood that the structure of the second shielded duct 31 is identical.

Each shielded duct 30 or 31 has an outer metallic shell 32 which surrounds a casing 33 of shielding material such as cast-iron or lead, said casing 33 being provided with an internal lining consisting of a layer 34 of heat-insulating material associated if necessary with an electric re-heating circuit (not shown in the drawings). An internal cavity 35 is thus delimited in the axis of each shielded duct and the flask 11 containing the assembly 10 which is immersed in sodium and is to be transferred can be brought into said cavity. At the upper end, the carriage 12 which carries the flask 11 is provided with a fastening-link 36 which is pivoted about a pin 37. Said fastening-link 36 is attached to the end of a lifting chain 38 which is wound around the sprocket-wheel of a hoist and this latter is actuated by a control reduction-gear motor 40 which is located outside the corresponding shielded duct. After passing over the sprocket-wheel 39, said chain 38 is stored in a receiving well 41, the wall 42 of which is rigidly fixed to the upper portion of the shielded duct.

The shielded duct 30 or 31 is connected at the lower end to a body 43 forming a rotating portion of the hood and comprising a transverse flange 44, the external surface of which carries the toothed ring 25, said ring being disposed in meshing engagement with the pinion 26 which is driven by the reduction-gear motor 27 as had already been stated. This movement of rotation of the hood takes place on a frame 45 which supports the bearing 24. Leak-tightness between said frame and the lower portion of the body 43 is ensured by means of suitable seals, especially lateral seals 46 of the lipped type, for example, which are centered on the rotational axis 23 of the hood. Said seals 46 are advantageously associated with small ducts 46a for the supply of a neutral gas under pressure so as to create a suitable barrier at the level of said seals. Leak-tightness between said frame and the bottom portion of said body is also provided by bottom seals 47 of the inflatable type which surround the lower ends of the cavities 35 of the two shielded ducts 30 and 31.

Finally, the frame 45 if provided beneath the movable body 43 of the hood 15 with a passage 48 in which a valve 49 can be mounted opposite to each shielded duct 30 and 31. The valve 49 has a transverse housing 50 for the displacement or shuttle action of a slide-valve 51 which is actuated by a push-rod 52. By means of said slide-valve, the ends of the shielded ducts can be closed-off beneath the hood body 15 at the time of rotational movements of the hood about the axis 23. Leak-tightness at the time of assembly of the valves 49 is ensured by means of seals such as 53 and 54 which are applied respectively against the top portion 22 of the concrete structure 1 beneath the support frame 45 provided for the movable portion 43 of the hood and against the slide-valve 51. The body of each valve 49 offers the possibility of adaptation to possible differences in level by means of springs 55 which are surrounded by annular bellows seals 56.

The equipment of the installation is finally completed by means of two additional valves 57 and 58 having sliding obturators and mounted in the top wall of the pressure vessel 2 in one case and in the top wall of the storage chamber 3 in the other case so as to close-off the upper ends of the passages 14 and 16 of the inclined guide ramps 13 and 17 at the time of movements of displacement of the hood 15 over the structure 1, for example for the purpose of maintenance or repair work on its components.

During normal operation, the flask 11 which is loaded with a spent fuel assembly 10 to be withdrawn, for example, from the pressure vessel 2, is moved upwards along the guide ramp 13 by means of the hoist motor 40 which actuates the chain sprocket 39 which is fitted at the end of the corresponding shielded duct 30. At the same time and by virtue of the arrangement which is contemplated and in which said first shielded duct 30 is duplicated by a second shielded duct 31, a second fresh fuel assembly is brought into this latter from the shielding chamber 3 by following the path of the guide ramp 17. During these operations, the valves 57 and 58 on the one hand and 49 on the other hand are in the open position, leak-tightness between the hood and the top face 22 of the structure 1 being ensured by means of the seals 46 and 54 whilst the inflatable seals 47 prevent any direct communication between the two passages 14 and 16 and the cavities 35 of the shielded ducts 30 and 31.

During the following stage, the slides of the slide-valve 49 are closed so as to seal-off the ends of the cavities 35 of the shielded ducts 30 and 31. The seals 47 are deflated, whereupon the rotation of the movable portion 43 of the hood 15 is initiated about the vertical axis 23 of this latter by the toothed ring 25, the pinion 26 and the reduction-gear motor 27. During this movement of rotation, the flasks 11 which contain the fuel assemblies 10 are in the top position at the bottom of the cavities of the two shielded ducts 30 and 31. After a pivotal movement through 180°, the reverse operations are initiated so as to displace the two fuel assemblies aforesaid in the downward direction along the guide ramps 13 and 17, the fresh fuel assembly being positioned within the pressure vessel 2 and the irradiated assembly being positioned within the storage chamber 3.

Among the advantages provided by the transfer hood under consideration, it should be emphasised that the device in accordance with the invention is such that it has a relatively small mass, that transfers are effected between the pressure vessel of the reactor and the storage chamber without any interruption of either leak-tightness or radiation shielding. Moreover, the control devices are mostly located outside the hood and are therefore easier to maintain. Finally, the relatively small mass of the hood makes it possible to remove this latter without any difficulty either for maintenance or replacement of the hood components and in particular the valves which are placed at the bottom portion or the systems which control the inflatable seals.

The hood under consideration applies in particular to any operation which involves handling between two enclosures or vessels filled with liquid and placed in close proximity to each other; it is especially worthy of note that the use of the hood is particularly advantageous in sodium-cooled fast reactors. However, it is readily apparent that the invention is not limited solely to the practical example of construction which has been described in the foregoing with reference to the accompanying drawings but extends to all alternative forms. In particular, by employing one or a number of shielded ducts, the hood could be designed to serve a plurality of passages for inclined guide ramps which are disposed in a conical arrangement around the pivotal axis of the hood; this alternative form of construction corresponds in particular to the arrangement of a number of storage chambers which are placed in adjacent relation but are separate from each other.

What we claim is:

1. A transfer hood for a nuclear reactor and especially a fast reactor comprising a core, a group of fuel assemblies, for said core, a pressure vessel containing said core, at least one separate chamber adjacent said vessel for the storage of fuel assemblies after withdrawal of said assemblies from said pressure vessel, at least two separate and oblique guide ramps having the same angle of inclination with respect to the vertical, one of said guide ramps extending through a first passage into said pressure vessel, the second of said guide ramps extending through a second passage into said fuel assembly storage chamber, a rotating transfer hood, two shielded ducts in said hood each having an open lower end, a horizontal positioning flange for said hood, said hood rotating about a vertical axis, said lower ends of said shielded ducts opening over one of said guide ramps and then the other upon rotation of said hood, said horizontal flange of said hood including a peripheral toothed ring, a pinion driven by a reduction-gear motor engaging said ring, a support frame for said hood mounted on said pressure vessel, a roller-bearing mounting said hood on said frame for rotation, positioning means and sealing means between said hood and said frame, said two inclined ducts being disposed in two symmetrical vertical planes relatively displaced on each side of the axis of said horizontal flange and alternately forming an extension of said two guide ramps upon rotation of said hood through an angle of 180°.

2. A transfer hood according to claim 1, said shielded ducts being inclined to the vertical at the same angle as said guide ramps.

3. A transfer hood according to claim 1, including a chain-type hoist at the upper end of each of said ducts for controlling a carriage, a flask supported by said carriage containing the fuel assembly to be transferred as said carriage is displaced within said duct and along said inclined guide ramp in the line of extension of said duct.

4. A transfer hood according to claim 3, including a well sealed to said duct receiving the chain of said hoist.

5. A transfer hood according to claim 1 including at least one slidevalve body in said frame isolating each of said inclined guide ramps from said shielded ducts during rotation of of said hood.

6. A transfer hood according to claim 5, including means for applying said valve body against said pressure vessel and said storage chamber in leak-tight manner after rotation of said hood over said inclined guide ramps, said means including at least one spring and an annular bellows element connected to said valve body and to said support frame.

* * * * *